(12) United States Patent
Teshima et al.

(10) Patent No.: US 12,278,354 B2
(45) Date of Patent: Apr. 15, 2025

(54) BATTERY CONTAINMENT CONSTRUCT

(71) Applicants: Teijin Limited, Osaka (JP); Continental Structural Plastics, Inc., Auburn Hills, MI (US)

(72) Inventors: Masatomo Teshima, Osaka (JP); Max Kamiyama, Osaka (JP); Shunsuke Tamura, Osaka (JP); Hugh Foran, Auburn Hills, MI (US)

(73) Assignees: Teljin Limited, Osaka (JP); Teijin Automotive Technologies, Inc., Auburn Hills, MI (US)

(*) Notice: Subject to any disclaimer, the term of this patent is extended or adjusted under 35 U.S.C. 154(b) by 631 days.

(21) Appl. No.: 17/609,719

(22) PCT Filed: May 7, 2020

(86) PCT No.: PCT/US2020/031750
§ 371 (c)(1),
(2) Date: Nov. 8, 2021

(87) PCT Pub. No.: WO2020/227458
PCT Pub. Date: Nov. 12, 2020

(65) Prior Publication Data
US 2022/0216560 A1 Jul. 7, 2022

Related U.S. Application Data

(60) Provisional application No. 62/844,567, filed on May 7, 2019.

(51) Int. Cl.
*H01M 10/625* (2014.01)
*B60L 3/00* (2019.01)
(Continued)

(52) U.S. Cl.
CPC ......... *H01M 10/625* (2015.04); *B60L 3/0007* (2013.01); *B60L 50/64* (2019.02);
(Continued)

(58) Field of Classification Search
CPC .. H01M 10/625; H01M 50/242; H01M 50/20; H01M 2220/20; H01M 50/204;
(Continued)

(56) References Cited

U.S. PATENT DOCUMENTS 9,484,602 B1 11/2016 Podolefsky
2011/0143179 A1* 6/2011 Nakamori ........... H01M 50/271
429/99

(Continued)

FOREIGN PATENT DOCUMENTS

| CN | 203218356 U | 9/2013 |
| EP | 2501576 B1 | 8/2013 |
| KR | 1020180134059 A | 12/2018 |

OTHER PUBLICATIONS

Int'l Search Report for PCT/US2020/031750, dated Aug. 24, 2020.
Supplementary European Search Report issued in corresponding European Patent Appln. No. 20802817.5, dated Oct. 5, 2023.

*Primary Examiner* — Thiem D Phan
(74) *Attorney, Agent, or Firm* — MaxGoLaw PLLC (57) ABSTRACT

A battery containment construct is provided that includes a unitary tray having a bottom and a set of walls including a first side wall, a second side wall, a first end wall, and a second end wall. The set of walls extending from the bottom of the tray and defining a cavity within the tray. A cover removably attached to the plurality of walls of said tray opposite the bottom of said tray. Energy absorption components attached to the bottom of the tray external to at least one of the set of walls in some versions to enhance impact resistance. The construct has high strength, is light weight and well suited for containing and protecting energy cells or (Continued)

batteries that adjusted to impact resistance, fire resistance, and fluid penetration prevention.

24 Claims, 9 Drawing Sheets

(51) Int. Cl.
| | |
|---|---|
| *B60L 50/64* | (2019.01) |
| *B60L 58/24* | (2019.01) |
| *H01M 50/204* | (2021.01) |
| *H01M 50/224* | (2021.01) |
| *H01M 50/227* | (2021.01) |
| *H01M 50/24* | (2021.01) |
| *H01M 50/242* | (2021.01) |
| *H01M 50/249* | (2021.01) |
| *H01M 50/271* | (2021.01) |
| *H01M 50/278* | (2021.01) |
| *H01M 50/282* | (2021.01) |

(52) U.S. Cl.
CPC ........... *B60L 58/24* (2019.02); *H01M 50/204* (2021.01); *H01M 50/224* (2021.01); *H01M 50/227* (2021.01); *H01M 50/24* (2021.01); *H01M 50/242* (2021.01); *H01M 50/249* (2021.01); *H01M 50/271* (2021.01); *H01M 50/278* (2021.01); *H01M 50/282* (2021.01); *H01M 2220/20* (2013.01); *Y10T 29/49108* (2015.01)

(58) Field of Classification Search
CPC ................ H01M 50/24; H01M 50/289; Y10T 29/49108
USPC .......................... 29/623.1, 469, 592.1, 602.1
See application file for complete search history.

(56) References Cited

U.S. PATENT DOCUMENTS

| | | | |
|---|---|---|---|
| 2012/0223113 | A1 | 9/2012 | Gaisne et al. |
| 2014/0154535 | A1 | 6/2014 | Olson et al. |
| 2018/0123101 | A1 | 5/2018 | Maguire et al. |
| 2018/0337377 | A1* | 11/2018 | Stephens ............. H01M 50/224 |

* cited by examiner

BATTERY CONTAINMENT CONSTRUCT

CROSS-REFERENCE TO RELATED APPLICATION

This application claims priority of U.S. Provisional Patent Application Ser. No. 62/844,567 filed May 7, 2019, which is incorporated herein by reference.

FIELD OF THE INVENTION

The present invention in general relates to a high strength, light weight containment construct and in particular to a high strength, light weight containment construct for containing for example, a fuel cell or battery, to provide impact resistance, fire resistance, and fluid penetration prevention.

BACKGROUND OF THE INVENTION

Weight savings in the automotive, transportation, aerospace, and logistics-based industries has been a major focus in order to make more fuel-efficient vehicles both for ground and air transport. In order to achieve these weight savings, light weight composite materials have been introduced to take the place of metal structural and surface body components and panels. Composite materials are materials made from two or more constituent materials with significantly different physical or chemical properties, that when combined, produce a material with characteristics different from the individual components. The individual components remain separate and distinct within the finished structure. A composite material may be preferred for reasons that include materials which are stronger, lighter, or less expensive when compared to traditional materials of steel or aluminum. Still another advantage over metals is reduced corrosion, leading to longer operational life and reduced maintenance costs.

Composites typically have two constituent materials: matrix and reinforcement. The matrix material surrounds and supports the reinforcement materials by maintaining their relative positions. The reinforcements impart their special mechanical and physical properties to enhance the matrix properties. A synergism produces material properties unavailable from the individual constituent materials, while the wide variety of matrix and strengthening materials allows the designer of the product or structure to choose an optimum combination.

The use of fiber inclusions to strengthen a matrix is well known to the art. Well established mechanisms for the strengthening of a matrix include slowing and elongating the path of crack propagation through the matrix, as well as energy distribution associated with pulling a fiber free from the surrounding matrix material. In the context of sheet molding composition (SMC) formulations, bulk molding composition (BMC) formulations, and resin transfer molding (RTM) fiber strengthening has traditionally involved usage of chopped glass fibers, while carbon fibers are known to be high strength and low weight reinforcements.

Weight savings are particularly important for electric and hybrid vehicles powered with energy cells employing battery technologies in order to achieve greater vehicle driving range per charge. However, unique problems associated with some components of electric and hybrid vehicles have hindered the ability to use composite materials for some applications on hybrid or electric vehicles. For example, batteries of electric and hybrid vehicles present unique safety considerations owing to the high voltages of the batteries, chemicals employed in the battery technologies, combustion and fire risks associated with the batteries, and potential fume encounters if the batteries are broken or damaged. Therefore, batteries of electric and hybrid vehicles generally require protective containers designed to shield batteries from forces they may otherwise experience during an impact or crash event. Generally, such protective containers are high strength boxes formed of welded metals, which are heavy, prone to corrosion, and have been found to be water penetrable at at least the welds.

Thus, there exists a need for a battery containment construct design that utilizes composite materials to lower the weight of the component, while improving the safety performance compared to conventional vehicle components.

SUMMARY OF THE INVENTION

A battery containment construct is provided that includes a unitary tray having a bottom and a set of walls including a first side wall, a second side wall, a first end wall, and a second end wall. The set of walls extending from the bottom of the tray and defining a cavity within the tray. A cover removably attached to the plurality of walls of said tray opposite the bottom of said tray. Energy absorption components attached to the bottom of the tray external to at least one of the set of walls in some versions to enhance impact resistance. The construct has high strength, is light weight and well suited for containing and protecting energy cells or batteries that adjusted to impact resistance, fire resistance, and fluid penetration prevention.

BRIEF DESCRIPTION OF THE DRAWINGS

The present invention is further detailed with respect to the following drawings that are intended to show certain aspects of the present invention but should not be construed as a limit on the practice of the present invention.

DESCRIPTION OF THE INVENTION

The present invention has utility as a high strength, light weight containment construct for containing and protecting energy cells or batteries that provides impact resistance, fire resistance, and fluid penetration prevention.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below. As used in the description of the invention and the appended claims, the singular forms "a," "an" and "the" are intended to include the plural forms as well, unless the context clearly indicates otherwise. Also as used herein, "and/or" refers to and encompasses any and all possible combinations of one or more of the associated listed items, as well as the lack of combinations when interpreted in the alternative ("or").

As used herein "fluid penetration" refers to a single piece or joined piece construction that prevents unintended transit of gaseous or liquid coolants through a construct component in general, and a tray in particular.

Referring now to the figures, a battery containment construct 10 according to embodiments of the present invention includes a tray 20, and a cover 40. In some inventive embodiments, as shown in the figures, a pair of energy absorption components 30, 30' are provided to impart impact resistance to the construct 10. It is appreciated that the relative placement of an inventive construct 10 largely dictates the need for additional impact resistance. By way of example, a construct 10 surrounded by a vehicle chassis has reduced or no need for energy absorption components, while in contrast, placement under a vehicle side door has a consider need to inhibit impact induced intrusion into the contained volume of a construct 10.

The tray 20, the pair of energy absorption components 30, 30', if present, and the cover 40 are configured to be assembled in such a way as to form a high strength, light weight containment construct 10 that provides impact resistance, fire resistance, and fluid penetration prevention to contents contained within the construct 10, which according to embodiments is a plurality of batteries 50. The containment construct 10 is particularly suitable for containing batteries of a hybrid or electric vehicle. The battery containment construct 10 absorbs and dissipates kinetic energy experienced during a crash or impact event. In particular, the battery containment construct 10 according to embodiments of the present invention exhibits minimal (less than 40%) intrusion into the enclosure and high resistance (at least 80 kN) to the impact when subjected to a quasi-static load by a 10 inch (25 cm) diameter rigid column located at the center of the battery and traveling perpendicular into a predominate longitudinal or lateral edge of the battery containment construct 10. Additionally, during such crash event or impacts, the content of the construct 10, such as batteries contained experience limited deformation of the cell perimeter and the high voltage wiring connecting the batteries to other systems of the electric or hybrid vehicle experiences little to no loading.

The tray 20 of an inventive battery containment construct 10 includes a bottom 22 and walls including a first and second side wall 24, 24' and a first and second end wall 26, 26'. The walls extend from one side of the bottom 22 of the tray 20. The walls and the bottom 22 define a cavity 28 within the tray 10. The first and second energy absorption components 30, 30' are attached to the bottom 22 of the tray 20 external to the cavity 28. That is, a first of the energy absorption components 30 is attached to the bottom 22 of the tray 20 external to the first side wall 24 while the second energy absorption component 30' is attached to the bottom 22 of the tray 20 external to the second side wall 24'. The cover 40 is removably attachable to the walls 24, 24', 26, 26' of the tray 20 opposite the bottom 22 of the tray 20.

Figure 2:
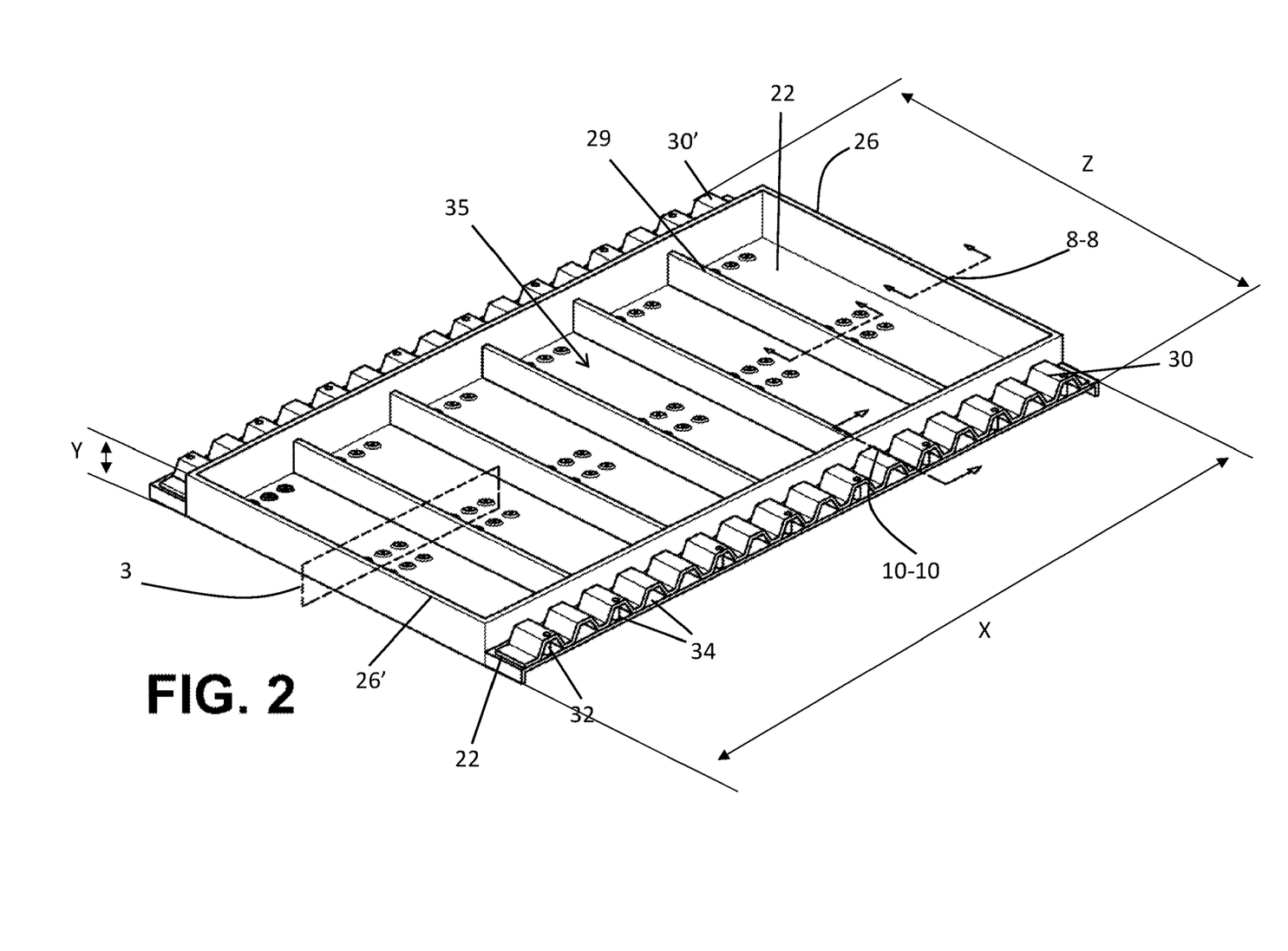
FIG. 2 is a perspective view of a tray and energy absorption components of a battery containment construct assembled together according to an embodiment of the present invention.

As shown in FIG. 2, when the first and second energy absorption components 30, 30' are present and attached to the bottom 22 of the tray 20, a plurality of voids 34 are defined between the bottom 22 of the tray 20 and each of the first and second energy absorption components 30, 30'. According to certain inventive embodiments, the voids 34 are packed with a fire-retardant material or a fire-resistant material. In addition to providing fire resistance and extinguishing capabilities, the fire-retardant material or fire-resistant material packed in the voids 34 provides additional impact resistance. According to other inventive embodiments, any of the components of an inventive battery containment construct 10 may have one or more coatings, shown generically at 35. The coating 35 illustratively includes materials that impart fire resistance, are phenolic in nature, electromagnetic interference-radiofrequency interference (EMI-RFI) resistance, or a combination of such coatings. It is appreciated that coating as used in this context is intended to include separate layers of material that are applied as a sheet material to a substrate of the construct 10.

That is, according to embodiments, the tray 20, the energy absorption components 30, 30', the cover 40, or a combination thereof are coated in a fire resistant, or a fire-retardant material. A fire-resistant material is one that is designed to resist burning and withstand heat and provide insulation to the substrate, while a fire-retardant material is designed to burn slowly and reduce the rate of flame spread. Intumescent fire-resistant materials work by expanding their volume from 15 to 30 times and generating an ash-like char layer that erodes as fire exposure continues. Expansion then occurs again with the number of times the process repeats itself dependent upon the thickness of the coating. For example, such fire resistant or fire retardant materials for packing in voids 34 or coating any of the tray 20, the energy absorption components 30, 30', the cover 40 include any of the following: silicone, casein or vinyl resins, aluminum trihydrate or antimony oxide, ammonium polyphosphate, pentaerythritol, melamine derivatives, boric acid ($H_3BO_3$) and borax ($Na_2B_4O_7.10H_2O$), disodium octaborate tetrahydrate ($Na_2B_8O_{13}.4H_2O$), dicyandiamide-formaldehyde-phosphoric acid, melamine-dicyandiamide-formaldehyde-phosphoric acid, poly(n-vinylpyrolidone), colloidal silica, magnesium hydroxide (MDH), monoammonium phosphate (MAP), aluminum hydroxide (ATH), carbonates and hydrogen carbonates, potassium carbonate, $Na_2WO_4$, $Na_2SnO_3$, $Na_2MoO_4$, ammonium polyphosphate, pentaerythritol, melamine, expandable graphite, or combinations thereof. Phenolic resins operative herein illustratively includes epoxy phenolic resins, and phenol formaldehyde resins that impart corrosion resistance and a mar resistance surface relative to the underlying substrate of the construct 10. EMI-RFI shielding coatings operative herein illustratively include nickel coated glass mat; carbon fiber matting; copper or nickel paint; various metal foils, such as aluminum, nickel, iron, copper, and alloys thereof; and or combinations thereof with the proviso that the EMI-RFI shielding is grounded so as to function as a Faraday cage. It is further appreciated that coatings 35 in the form of sheets are readily applied as an underlying sheet below an inventive construct 10.

According to certain inventive embodiments, the cover 40 is formed of reinforced sheet molding compound (SMC), a phenolic-SMC, epoxy, acrylonitrile butadiene styrene (ABS), polycarbonate, random-oriented fiber reinforced thermoplastic resin (FRTP), steel, or aluminum. Sheet molding compound (SMC) or sheet molding composite is a ready to mold fiber-reinforced polyester material primarily used in compression molding. SMC is a reinforced composite material that is manufactured by dispersing long strands (20-60 mm) of chopped glass fibers in a matrix of polyester resin. It is appreciated that fibers with long range order are also operative herein and include woven mats, continuous fibers, or sheet forms. Thermoplastic materials operative herein amenable to functioning as a fiber matrix illustratively include: poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, or block copolymers of any one of the aforementioned constituting the majority by monomer number. Reinforcing fibers and fillers operative herein illustratively include carbon fibers, glass fibers, aramid fibers, cellulosic fibers, or a combination thereof. In some inventive embodiments, the chopped fiber is glass fiber, alone or in combination with other types of fiber or reinforcing fillers. According to embodiments, the cover 40 is formed of glass fiber reinforced SMC. As noted above, a coating 35 is readily applied to a cover 40 in some inventive embodiments.

According to certain inventive embodiments, the battery containment construct further includes a seal 42 positioned between the cover 40 and the plurality of walls 24, 24', 26, 26' of the tray 20. The seal 42 may be provided on either of the cover 40 or the plurality of wall. The seal 24 is formed of an elastomeric material. The seal 42 ensures water tight engagement between the tray 20 and the cover 40.

Figure 1:
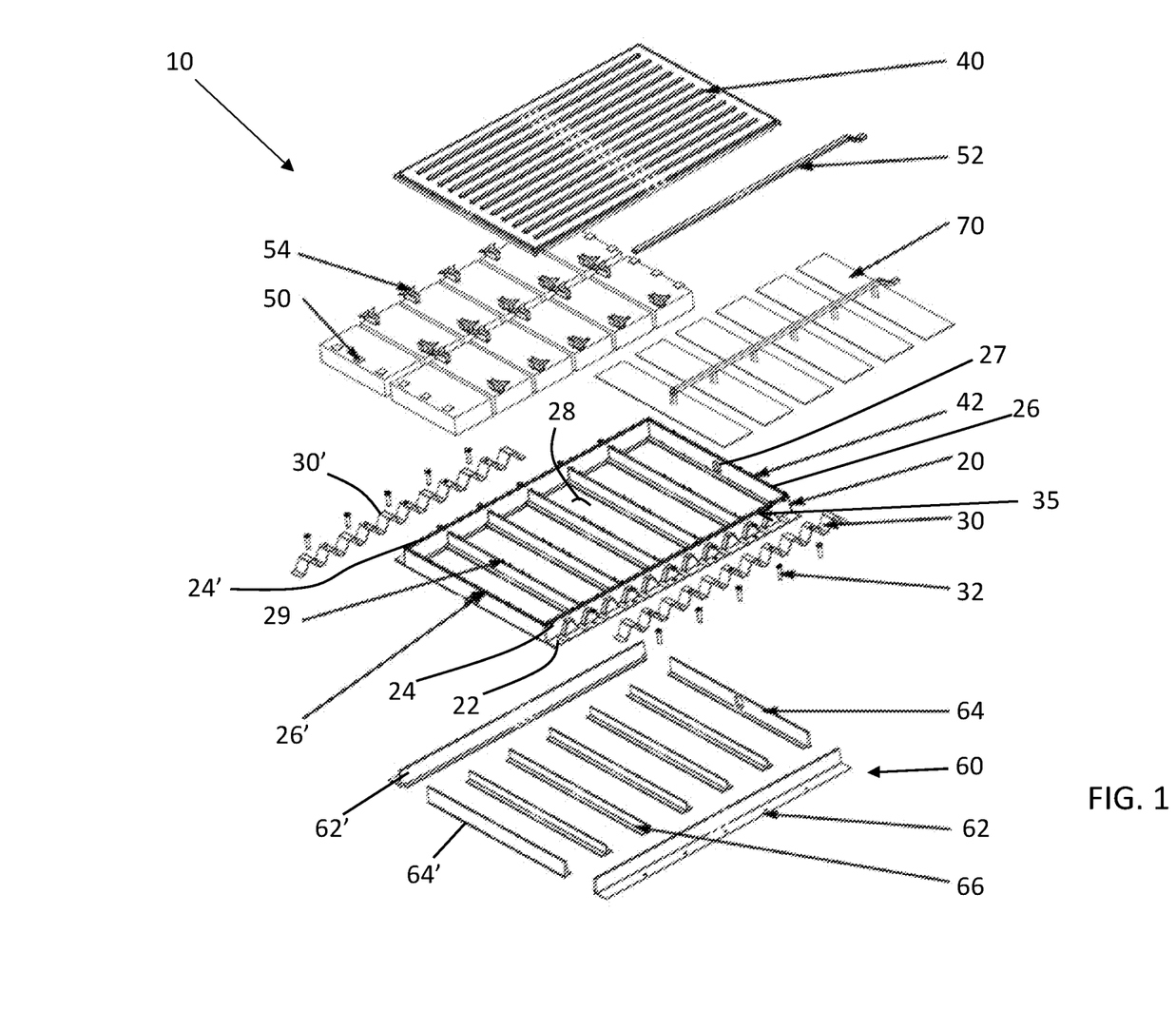
FIG. 1 is an exploded perspective view of a battery containment construct according to embodiments of the present invention.

According to certain inventive embodiments, the tray 20 further includes internal divider walls 29, which divide the cavity 28 into sections of sub-cavities. The internal divider walls 29 extend from the bottom 22 of the tray 20 between the first side wall 24 and the second side wall 24'. It will be appreciated that the internal divider walls 29 could alternatively or additionally span between the first end wall 26 and the second end wall 26'. The internal divider walls 29 provide additional structural rigidity to the battery containment construct 10 and provide support to batteries 50 positioned within the containment construct 10 to limit shifting of the batteries 50 within the containment construct. According to embodiments, the tray 20 also includes a through hole 27 defined in at least one of the walls 24, 24', 26, 26'. The through hole 27 allows a wire or cable 52 to be passed therethrough, such as a high voltage wire 52 for connecting the batteries 50 contained within the battery containment construct 10 to the other systems of the hybrid or electric vehicle systems. In FIG. 1, the through hole 27 is defined in the first end wall 26; however it will be understood that a through hole 27 may be provided in any of the plurality of walls 24, 24', 26, 26', the cover 40, or the bottom 22 of the tray 20 based on design requirements and routing of a high voltage wire 52 for connecting the batteries 50 to other systems of the hybrid or electric vehicle.

According to embodiments, the tray 20 is formed of a reinforced sheet molding compound (SMC), epoxy, acrylonitrile butadiene styrene (ABS), polycarbonate, or random-oriented fiber reinforced thermoplastic resin (FRTP). Thermoplastic materials referred to herein include but are not limited to poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, or block copolymers of any one of the aforementioned constituting the majority by monomer number. Reinforcing fibers and fillers operative herein illustratively include carbon fibers, glass fibers, aramid fibers, cellulosic fibers, or a combination thereof. In some inventive embodiments, the chopped fiber is glass fiber, alone or in combination with other types of fiber or reinforcing fillers. According to embodiments, the tray 20 is formed of glass fiber reinforced SMC or carbon fiber reinforced SMC.

Figure 3:
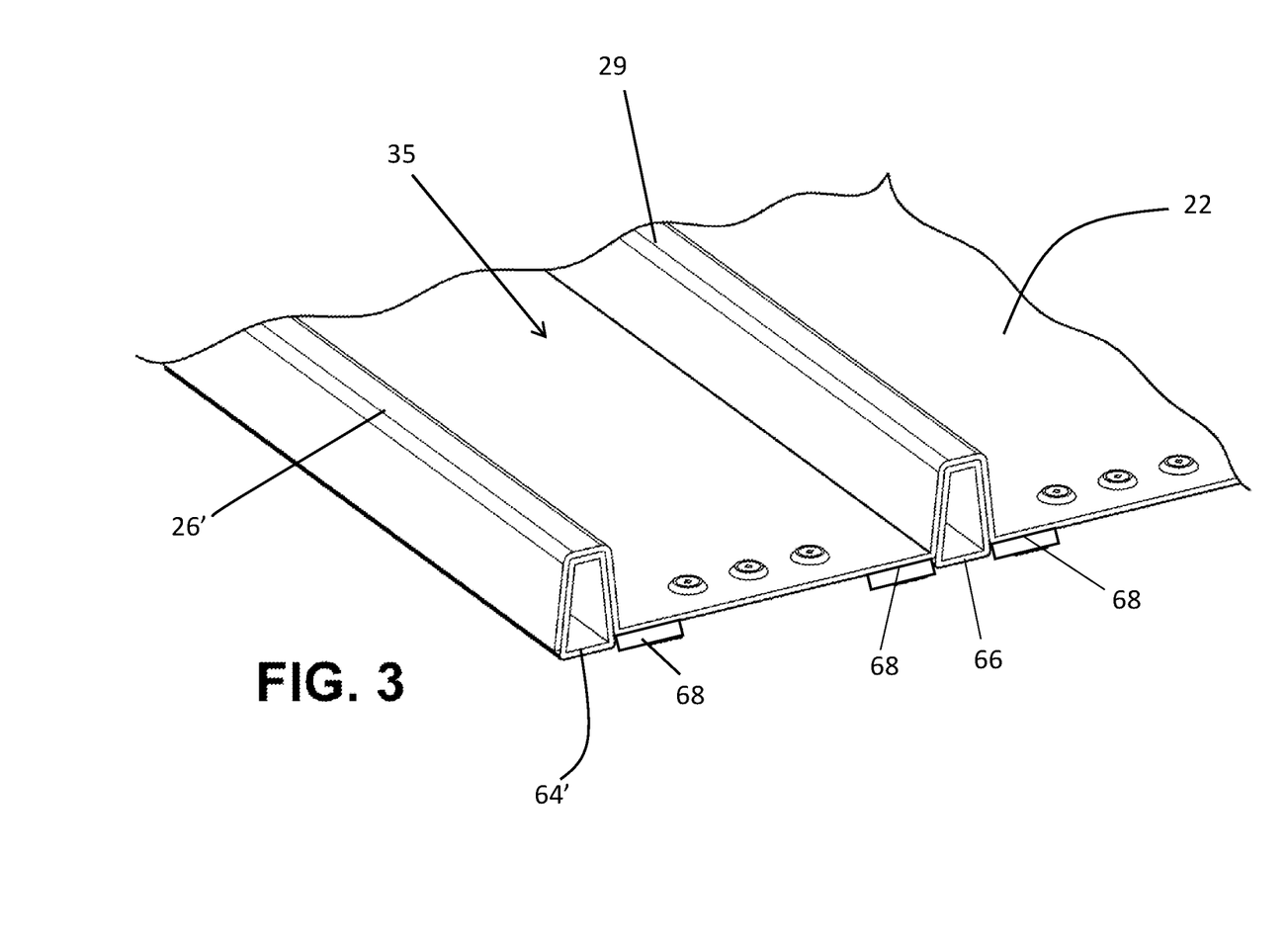
FIG. 3 is a detailed perspective view of a portion of the battery containment construct shown in the dashed oval 2 of FIG. 2.

According to embodiments, a battery containment construct 10 further includes a frame 60 for reinforcing the tray 20. The reinforcing frame 60 includes members including any of a first and a second side member 62, 62', a first and a second end member 64, 64', and cross members 66. As shown in FIG. 1, the members 62, 62', 64, 64', 66 of the reinforcing frame 60 are any of T-shaped or L-shaped members or a combination thereof. In other words, the members 62, 62', 64, 64', 66 of the reinforcing frame 60 include upwardly extending portions and outwardly extending portions. The upwardly extending portions of the members 62, 62', 64, 64', 66 are configured to engage with the protrusions of the walls 24, 24', 26, 26', 29 that extend from the bottom 22 of the tray 20, while the outwardly extending or flange portions 68 of the members 62, 62', 64, 64', 66 are configured to engage with the bottom 22 of the tray 20 on a side of the bottom 22 opposite one of the walls 24, 24', 26, 26' of the tray 20, as shown in the detailed perspective view of FIG. 3. The reinforcing frame 60 is formed of any of reinforced polymer, such as those reinforced with glass fibers or carbon fibers, aluminum, or steel. According to embodiments, the members of the frame 60 are discrete, individual sections that remain as such until joined with the tray 20. According to other inventive embodiments, the members of the frame 60 are discrete, individually formed sections that are joined together prior to being joined with the tray 20. In yet another inventive embodiment, the reinforcing frame 60 is formed as a single frame comprising joined members that is then joined to the tray 20.

According to certain inventive embodiments, the energy absorption components 30, 30' are formed of any of carbon fiber reinforced thermoplastic (CFRTP), aluminum, or steel. According to certain inventive embodiments, the energy absorption components 30, 30' are formed of a carbon fiber reinforced thermoplastic known as SEREEBO(R)™, having composition including Carbon fibers "Tenax" (registered trademark) STS40-24KS (average fiber diameter: 7.mu.m, single yarn number: 24,000) manufactured by Teijin., Ltd., which had been cut to an average fiber length of 20 mm were used as carbon fibers. Nylon-6 resin A1030 manufactured by Unichika, Ltd. was used. In accordance with the method described in U.S. Pat. No. 8,946,342, there was manufactured a molding material precursor of the carbon fibers and the Nylon-6 resin, in which the carbon fibers had been randomly oriented in two-dimensions. The obtained molding material precursor was heated at 2.0 MPa for 5 minutes with a pressing device heated to 260.degree. C. to obtain a CFRTP material.

Figure 4A:
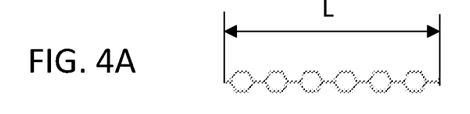
FIGS. 4A-4R show a side view of various configurations of an energy absorption component of a battery containment construct according to embodiments of the present invention.

As shown in FIG. 1, the first and second energy absorption components 30, 30' each have a repeating shape of a predetermined geometry. As shown in FIGS. 4A-4R, the repeating shape of the first and second energy absorption components 30, 30' is any of a closed hexagon (FIG. 4A), a closed circle (FIG. 4E), a closed triangle (FIG. 4L), a closed oval (FIG. 4P), a closed square (FIG. 4N), a closed rectangle (FIG. 4Q), an open semi hexagon (FIGS. 4B, 4C, and 4D), an open semi-circle (FIG. 4F), and open semi oval (FIG. 4G), an open triangle (FIG. 4K), an open semi square (FIG. 4M), and open semi rectangle (FIG. 4R), and a sine wave (FIG. 4O). As shown in FIGS. 4H, 4I, and 4J, the first and second energy absorption components 30, 30' are extruded or roll formed elongated forms with a continuous cross section. As shown in FIG. 4A the first and second energy absorption components 30, 30' have a length L measured from a first end to a second end. It will be readily understood that the various configurations of the first and second energy absorption components 30, 30' shown in FIGS. 4A-4R also have a length L measured from a first end to a second end, however the length L is not shown in all of the figures for clarity. FIGS. 5A-5R show end view of each of the first and second energy absorption components 30, 30' show in FIGS. 4A-4R, respectively. As shown in FIG. 5A the first and second energy absorption components 30, 30' have a width W and a height H. As with the length L, it will be understood that the width W and height H have not been shown in all of the figures for clarity. According to certain inventive embodiments, the length L of each energy absorption component 30, 30' is 5 to 5000 mm, the width W is 5 to 100 mm, and the height H is 5 to 100 mm. The length, L, width W, and height H of each energy absorption component 30, 30' generally corresponds to the overall length of the tray 20, height of the side walls 24, 24', and the width of a lip of the bottom 22 that extends beyond the walls 24, 24', 26, 26' of the tray 20 onto which the energy absorption components 30, 30' are attached.

Figures 6A, 6B:
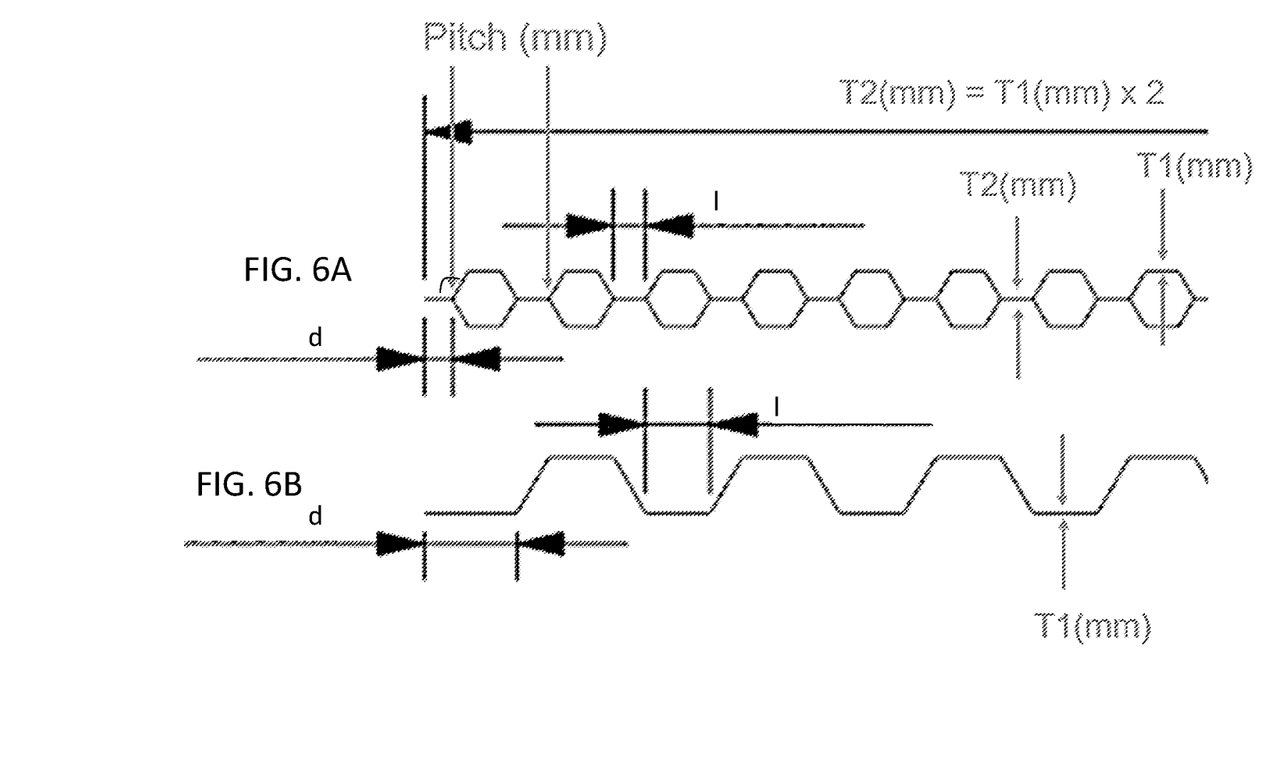
FIGS. 6A and 6B show a side view of energy absorption components of FIGS. 4A and 4B, respectively, with dimension indicators.
Figure 7A:
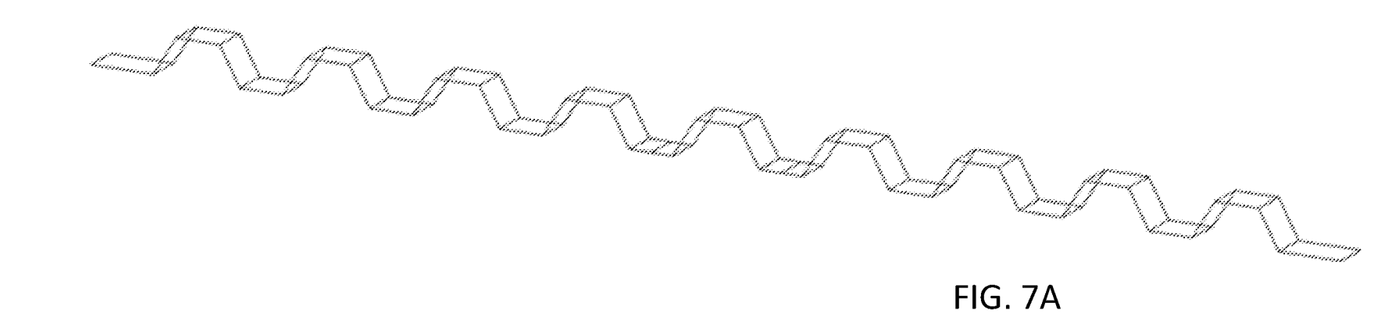
FIGS. 7A-7C show perspective view of various configurations of an energy absorption component of a battery containment construct according to embodiments of the present invention.
Figure 7B:
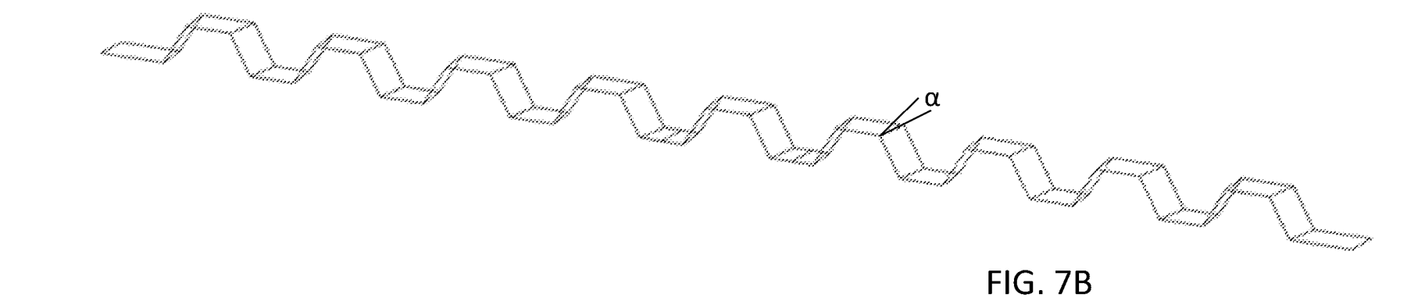
Figure 7C:
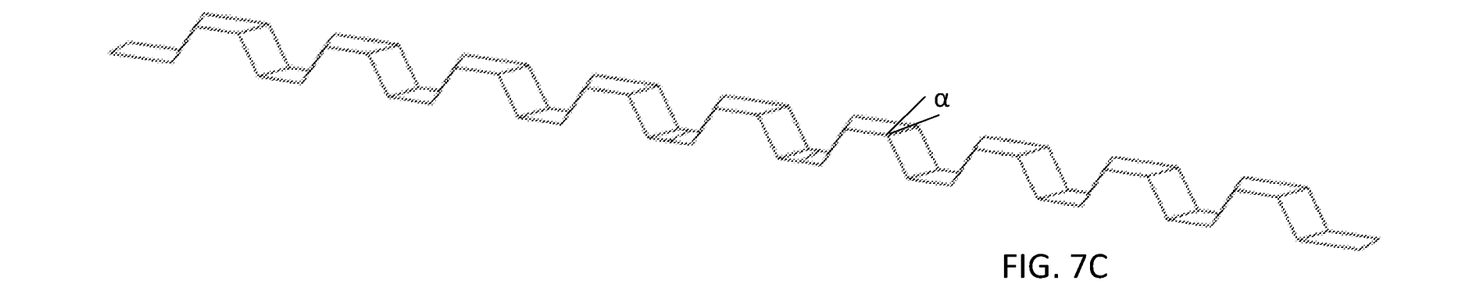

The geometry, including the length L, width W, and height H, along with internal dimensions including the length of each individual shape 1, distance between each shape d, pitch p, wall thickness T1, T2, and wall angle α, of each of the energy absorption components 30, 30' may be tuned to achieve various characteristics depending on design considerations and requirements of a particular containment construct 10. The length of each individual shape 1, distance between each shape d, pitch p, and wall thickness T1, T2 are shown in FIGS. 6A and 6B, which are detailed views of FIGS. 4A and 4B. Wall angle α is shown in FIGS. 7A-7C. Notable. The component shown in FIG. 7A is the same as the component shown in FIG. 4B. It will be understood that these dimensions are applicable to the various shapes of the first and second energy absorption components 30, 30' shown throughout FIGS. 4A-4R, but are not labeled in each figure for clarity. For example, as best shown in the exemplary shapes of FIGS. 4B, 4C, and 4D, the length 1 of each repeated shape and the distance d between each repeated shape can be increased or decreased to vary the strength characteristics of the first and second energy absorption components 30, 30'. According to certain inventive embodiments, the distance d between the repeated shapes is 0 to 300 mm. According to certain inventive embodiments, the length of each repeated shape is 20 to 300 mm. According to certain inventive embodiments, the pitch is 45 to 120 degrees. According to certain inventive embodiments, the thickness T1 is 0.25 to 5 mm and the thickness T2 is 0.25 to 10 mm. According to certain inventive embodiments, the thickness T2 is two times the thickness to T1. According to certain inventive embodiments, the wall angle α or tilt inward toward the voids 34 of the upward extensions of the repeated shapes is 0 to 25 degrees. For example, in FIG. 7A the wall angle α is 0 degrees, in FIG. 7B the wall angle α is 5 degrees, and in FIG. 7C the wall angle α is 12.5 degrees.

Further details of an inventive containment construct according to embodiments of the present invention are now described with reference to FIG. 8 which are detailed cross-sectional view of the construct of FIGS. 1 and 2 along cut lines 8-8 of FIG. 2, respectively; and references numerals detailed with respect to these figures have the aforementioned meanings associated therewith.

Figure 8:
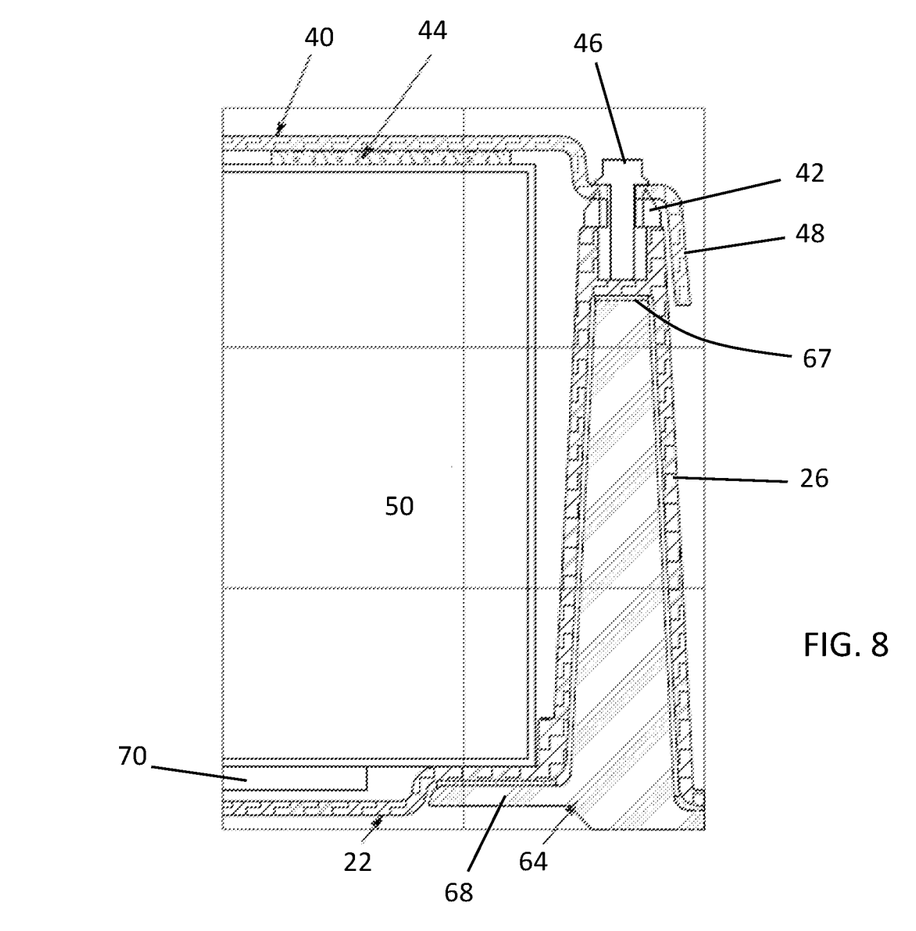
FIG. 8 is a detailed cross-sectional view of a portion of the battery containment construct of FIG. 2 along line 8-8.

In the cross-sectional view of FIG. 8, an end member 64 of frame 60 is shown positioned within the protrusion of end wall 26 of the tray 20. According to certain inventive embodiments, an adhesive 67 is applied between the frame 60 and the second side of the tray 20. In FIG. 8, the temperature regulation system 70 is shown positioned under the battery 50. As shown in FIG. 8, the battery 50 is not secured by a bracket and fastener to the end wall 26 of the tray, however, according to still other inventive embodiments, the battery 50 may be secured to the end wall 26 using a bracket and fasted. In FIG. 8, the cover 40 is attached to the end wall 26 of the tray 20 by a fastener 46. A seal 42 is positioned between the cover 40 and the walls 26 of the tray 20 to provide a water tight enclosure within the containment construct 10. According to embodiments, the cover 40 includes a lip 48 that extends from the generally planar cover 40 to cover the seal 42 in order to provide further resistance to water penetration. According to embodiments, a cushioning or shock absorbing material 44 such as foam is provided between the cover 40 and the batteries 50.

A side member 62 and a cross member 66 of frame 60 are shown in FIG. 2 engaged with an interior divider wall 29 and side wall 24 of the tray 20. The cover 40 is shown engaged with the seal 42 along the side wall 24 of the tray 20. The lip 48 of the cover 40 is shown to extend the length of the side wall 24. Energy absorbing component 30 is shown positioned on an exterior side of the side wall 24. According to embodiments, the energy absorption components 30, 30' are attached to the bottom 22 of the tray 20 with an adhesive 67, alternatively or additionally the energy absorption components 30, 30' are attached to the bottom 22 of the tray 20 with a fastener 32, which may engage with a through hole defined in the bottom 22 of the tray and/or defined in a flange 68 of the side member 62 of the frame 60.

According to certain inventive embodiments, a containment construct 10 has dimensions suitable to contain batteries 50 of an electric or hybrid vehicle. For example, embodiments of the inventive battery containment construct have a length X measured from the first end wall 26 to the second end wall 26' of the tray 20, a width Z measured from the first side wall 24 to the second side wall 24' of the tray 20, and a height Y measured from the second side of the bottom 22 of the tray 20 to the exterior side of the cover 40. According to embodiments, the overall dimensions of the assembled battery containment construct 10 are a height Y of 100 to 500 mm, a length X of 100 to 5000 mm, and a width Z of 100 to 3000 mm. According to embodiments, multiple layers of batteries 50 are stacked within the containment construct 10, resulting in taller containment constructs. According to embodiments, multiple layers of containment constructs 10 are stacked.

The present invention is further detailed with respect to the following non-limiting examples. These examples are exemplary of specific embodiments of the present invention and not intended to limit the scope of the appended claims.

EXAMPLES

Figure 9:
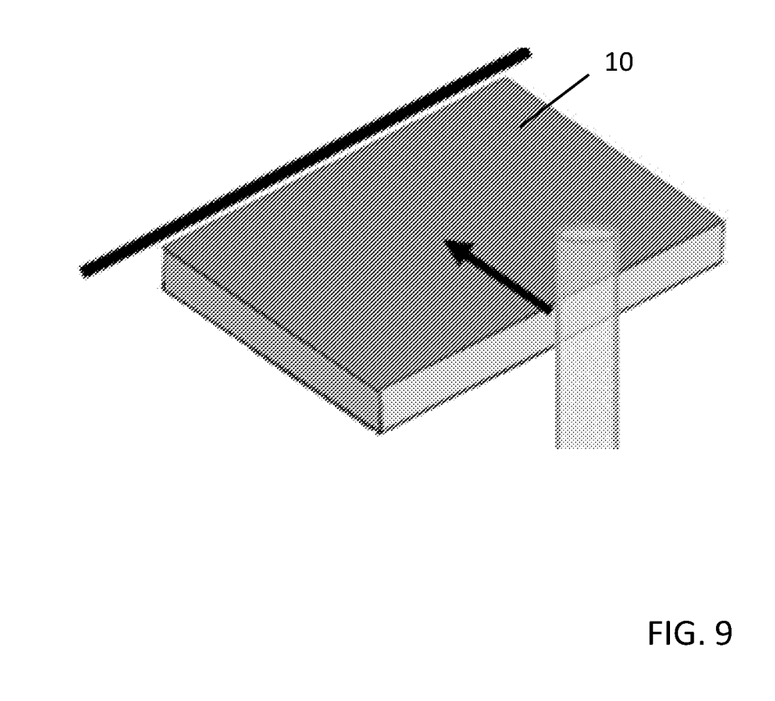
FIG. 9 is a schematic drawing of a pole test conducted on embodiments of the inventive battery containment construct.

Embodiments of the inventive battery containment construct 10 were constructed having various forms of the first and second energy absorption components 30, 30'. These battery containment constructs 10 were subjected to impact testing using a quasi-static load by a 10 inch (25 cm) diameter rigid column located at the center of the construct and traveling perpendicular into a predominate longitudinal or lateral edge of the battery containment construct 10 as shown in the schematic in FIG. 9.

In a first example, battery containment constructs 10 including energy absorption components 30, 30' formed of steel (SPFC590) having various geometries are tested for comparison. In this example, the containment constructs are subjected to 250 J impacts at an impact angle of 90 degrees. As shown in Table 1, different repeating shapes are tested as well as different thicknesses T1 and T2 and pitches p. The mass of each component and the deformation results of the impact testing are reported in Table 1.

TABLE 1

Figure 4B:
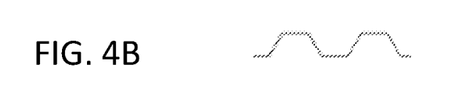
Figure 4C:
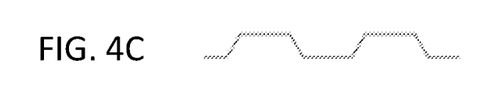
Figure 4D:
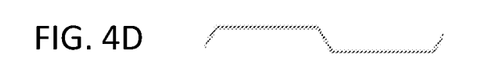
Figure 4E:
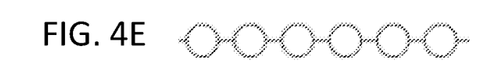
Figure 4F:
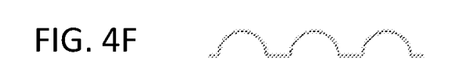
Figure 4G:
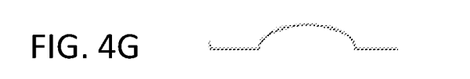
Figure 4H:
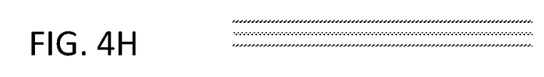
Figure 4I:
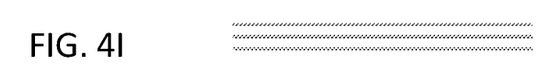
Figure 4J:
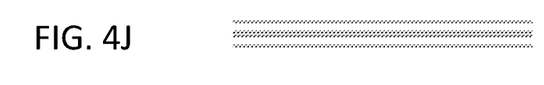
Figure 4K:
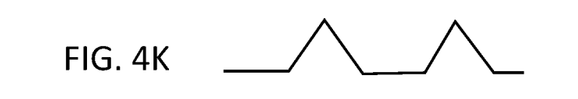
Figure 4L:
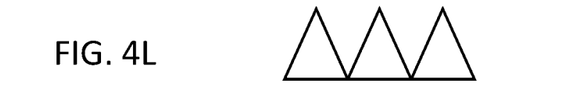
Figure 4M:
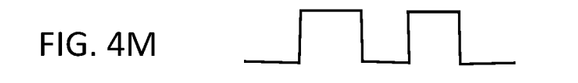
Figure 4N:
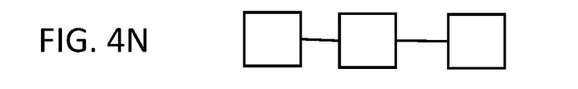
Figure 4O:
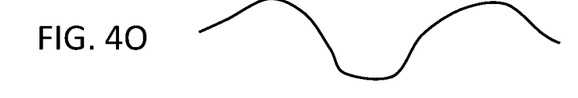
Figure 4P:
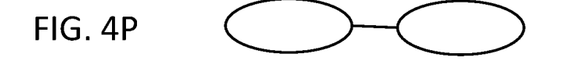
Figure 4Q:
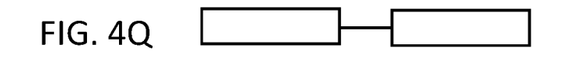
Figure 4R:
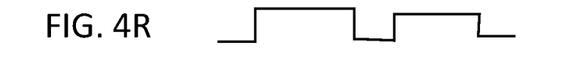
Figure 5A:
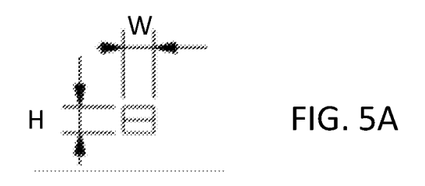
FIGS. 5A-5R show an end view of the configurations of an energy absorption component of a battery containment construct of FIGS. 4A-4R, respectively.
Figure 5B:
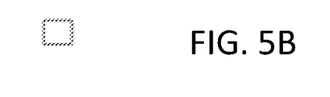
Figure 5C:
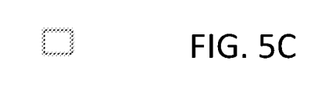
Figure 5D:
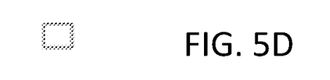
Figure 5E:
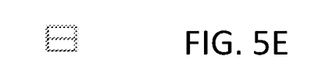
Figure 5F:
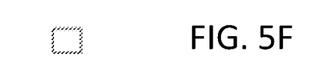
Figure 5G:
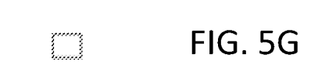
Figure 5H:
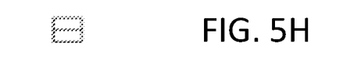
Figure 5I:
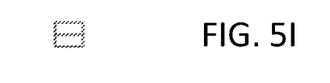
Figure 5J:
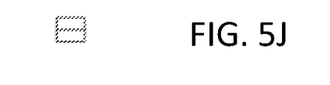
Figure 5K:
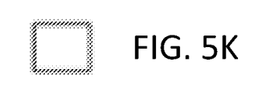
Figure 5L:
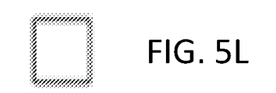
Figure 5M:
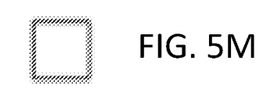
Figure 5N:
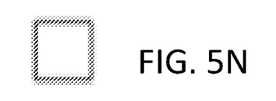
Figure 5O:
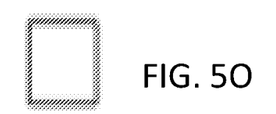
Figure 5P:
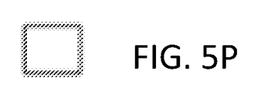
Figure 5Q:
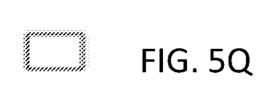
Figure 5R:
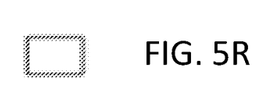

| Analysis File | Shape/ Reference FIG. | T1 mm | T2 mm | Mass kg | pitch mm | Deformation mm |
| --- | --- | --- | --- | --- | --- | --- |
| EA-1 | FIG. 4A | 0.73 | 1.46 | 1.33 | 104.5 | 11.9 |
| EA-2 | FIG. 4B | 0.93 | — | 1.33 | 207.8 | 18.3 |
| EA-3 | FIG. 4C | 1.01 | — | 1.33 | 323.3 | 28.4 |
| EA-4 | FIG. 4D | 1.11 | — | 1.33 | 577.3 | 49.6 |
| EA-5 | FIG. 4E | 0.71 | 1.41 | 1.33 | 90 | 8.1 |
| EA-7 | FIG. 4F | 0.89 | — | 1.33 | 180 | 16.3 |
| EA-12 | FIG. 4G | 1.08 | — | 1.32 | 360 | 44 |
| EA-9 | FIG. 4H | 0.22 | — | 1.33 | — | >70 |
| EA-10 | FIG. 4I | 0.26 | — | 1.33 | — | >70 |
| EA-11 | FIG. 4J | 0.23 | — | 1.33 | — | >70 |
| EA-2 | FIG. 4B | 0.930 | — | 1.33 | 207.8 | 18.3 |
| EA-9-2 | FIG. 4H | 0.620 | — | 3.77 | — | 18.4 |
| EA-10-2 | FIG. 4I | 0.690 | — | 3.55 | — | 18.4 |
| EA-11-2 | FIG. 4J | 0.790 | — | 4.68 | — | 18.2 |

In a second example, battery containment constructs 10 including energy absorption components 30, 30' formed of steel (SPFC590) having an open hexagon repeating shape are tested to compare the effects of varying the wall angle α. In this example, the containment constructs are subjected to 250 J impacts at an impact angles of 90 and 75 degrees. As shown in Table 2, in this example the thicknesses T1 and T2, pitch p, and mass are generally unchanged. The deformation results of the impact testing are reported in Table 2.

TABLE 2

| Analysis file | Shape/ Reference FIG. | t1 mm | Mass kg | pitch mm | Deformation mm | wall angle | Impact angle |
| --- | --- | --- | --- | --- | --- | --- | --- |
| EA-2 | FIG. 7A (FIG. 4B) | 0.93 | 1.33 | 207.8 | 18.3 | 0 | 90 |
| EA-13 | FIG. 7B | 0.93 | 1.33 | 207.8 | 19.5 | 5 | 90 |
| EA-14 | FIG. 7C | 0.92 | 1.33 | 207.8 | 19.7 | 12.5 | 90 |
| EA-2-obli | FIG. 7A (FIG. 4B) | 0.93 | 1.33 | 207.8 | 19.8 | 0 | 75 |
| EA-13-obli | FIG. 7B | 0.93 | 1.33 | 207.8 | 19.4 | 5 | 75 |
| EA-14-obli | FIG. 7C | 0.92 | 1.33 | 207.8 | 19.9 | 12.5 | 75 |

In a third example, battery containment constructs 10 including energy absorption components 30, 30' formed of steel (SPFC590), aluminum (A5052), and CFRTP (Teijin-SEREEBO®) having various geometries are tested for comparison. In this example, the containment constructs are subjected to 250 J impacts at an impact angle of 90 degrees. Table 3 reports the details of the different geometries tested and resulting impact deformations for each material.

TABLE 3

| Analysis file | Shape/ Reference FIG. | Material | t1 mm | t2 mm | Mass kg | pitch mm | Deformation mm |
| --- | --- | --- | --- | --- | --- | --- | --- |
| EA-1-2 | FIG. 4A | Steel (SPFC590) | 0.33 | 0.66 | 0.60 | 104.5 | 18.2 |
| EA-2 | FIG. 4B | Steel (SPFC590) | 0.93 | — | 1.33 | 207.8 | 18.3 |
| EA-11-2 | FIG. 4J | Steel (SPFC590) | 0.79 | — | 4.68 | — | 18.2 |
| EA-1-Al | FIG. 4A | Aluminum (A5052) | 0.82 | 1.64 | 0.52 | 104.5 | 18.6 |
| EA-2-Al | FIG. 4B | Aluminum (A5052) | 1.90 | — | 0.94 | 207.8 | 18.7 |
| EA-9-Al | FIG. 4H | Aluminum (A5052) | 0.95 | — | 2.00 | — | 18.8 |
| EA-1-Se | FIG. 4A | CFRTP(Teijin-SEREEBO®) | 1.40 | 2.80 | 0.45 | 104.5 | 17.9 |
| EA-2-Se | FIG. 4B | CFRTP(Teijin-SEREEBO®) | 3.00 | — | 0.75 | 207.8 | 18.7 |

In a fourth example, like the third example, battery containment constructs 10 including energy absorption components 30, 30' formed of steel (SPFC590), aluminum (A5052), and CFRTP (Teijin-SEREEBO®) having various geometries are tested for comparison. In this example, the containment constructs are subjected to 250 J impacts at an impact angle of 90 degrees. Table 4 reports the details of the different geometries tested and resulting impact deformations for each material.

TABLE 4

| Analysis file | Shape/ Reference FIG. | Material | Ply | Percent of 0° ply | t1 mm | Mass kg | pitch mm | Deformation mm |
|---|---|---|---|---|---|---|---|---|
| EA-2 | FIG. 4B | Steel (SPFC590) | — | — | 0.93 | 1.33 | 207.8 | 18.3 |
| EA-11-2 | FIG. 4J | Steel (SPFC590) | — | — | 0.79 | 4.68 | — | 18.2 |
| EA-2-Al | FIG. 4B | aluminum (A5052) | — | — | 1.90 | 0.94 | 207.8 | 18.7 |
| EA-9-Al | FIG. 4H | aluminum (A5052) | — | — | 0.95 | 2.00 | — | 18.8 |
| EA-2-Se | FIG. 4B | CFRTP (Teijin-SEREEBO(R)) | — | — | 3.00 | 0.75 | 207.8 | 18.7 |
| EA-2-CFRP | FIG. 4B | CFRP(DSM, PA410) | [0/45/−45]s | 50 | 1.92 | 0.51 | 207.8 | 17.7 |
| EA-9-CFRP | FIG. 4H | CFRP(DSM, PA410) | [0/90]s | 25 | 0.80 | 0.90 | — | 17.6 |
| EA-2-GFRP | FIG. 4B | GFRP(DSM, PA410) | [0/45/−45]s | 50 | 2.72 | 0.85 | 207.8 | 17.9 |
| EA-9-GFRP | FIG. 4H | GFRP(DSM, PA410) | [0/90]s | 25 | 1.12 | 1.49 | — | 18.5 |

In a fifth example, battery containment constructs 10 including energy absorption components 30, 30' formed of CFRP (DSM, PA410) having a repeating open hexagon shape and an extruded rectangular shape of various geometries are tested for comparison of ply. In this example, the containment constructs are subjected to 250 J impacts at an impact angle of 90 degrees. The results of these tests are shown in Table 5.

TABLE 5

| Analysis file | Shape/ Reference FIG. | Material | Ply | Percent of 0° ply | t1 mm | Mass kg | pitch mm | Deformation mm |
|---|---|---|---|---|---|---|---|---|
| EA-2-CFRP-1 | FIG. 4B | CFRP | 0 | 100 | 5.000 | 1.33 | 207.8 | 33.6 |
| EA-2-CFRP-2 | FIG. 4B | CFRP | [0/90]s | 50 | 5.000 | 1.33 | 207.8 | 5.7 |
| EA-2-CFRP-3 | FIG. 4B | CFRP | [0/45/−45]s | 50 | 5.000 | 1.33 | 207.8 | 5.1 |
| EA-2-CFRP-4 | FIG. 4B | CFRP | [0/45/−45]s | 75 | 5.000 | 1.33 | 207.8 | 5.6 |
| EA-2-CFRP-5 | FIG. 4B | CFRP | [0/45/−45]s | 25 | 5.000 | 1.33 | 207.8 | 5.2 |
| EA-2-CFRP-6 | FIG. 4B | CFRP | [45/−45]s | 0 | 5.000 | 1.33 | 207.8 | 6.4 |
| EA-9-CFRP-1 | FIG. 4H | CFRP | 0 | 100 | 1.180 | 1.33 | — | >70 |
| EA-9-CFRP-2 | FIG. 4H | CFRP | [0/90]s | 50 | 1.180 | 1.33 | — | 15.8 |
| EA-9-CFRP-3 | FIG. 4H | CFRP | [0/45/−45]s | 50 | 1.180 | 1.33 | — | 19.7 |
| EA-9-CFRP-4 | FIG. 4H | CFRP | [0/90]s | 75 | 1.180 | 1.33 | — | 22.6 |
| EA-9-CFRP-5 | FIG. 4H | CFRP | [0/90]s | 25 | 1.180 | 1.33 | — | 9.9 |
| EA-9-CFRP-6 | FIG. 4H | CFRP | 90 | 0 | 1.180 | 1.33 | — | >70 |

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A battery containment construct comprising:
   a unitary tray having a bottom and a plurality of walls including a first side wall, a second side wall, a first end wall, and a second end wall, the plurality of walls extending from the bottom of said tray and defining a cavity within said tray;
   a cover removably attached to the plurality of walls of said tray opposite the bottom of said tray; and
   foam is provided between the cover and the battery;
   wherein a first energy absorption component is attached to the bottom of said tray external to the first side wall, first end wall, or both the first side wall and the first end wall and a second energy absorption component is attached to the bottom of said tray external to the second side wall, second end wall, or both the second side wall and the second end wall and wherein the first energy absorption component and the second energy absorption component each have a repeating shape.

2. The battery containment construct of claim 1 wherein said tray is formed of a reinforced sheet molding compound (SMC) or a reinforced phenolic-SMC.

3. The battery containment construct of claim 1 wherein said tray is a unitary tray.

4. The battery containment construct of claim 1 wherein the two opposing side members, the two opposing end members, and the plurality of cross members of said reinforcing frame are individually formed and configured to be joined together prior to being installed with said tray.

5. The battery containment construct of claim 1 wherein said tray further comprises internal divider walls integrally formed and extending from the bottom of said tray between the first side wall and second side wall within the cavity.

6. The battery containment construct of claim 1 wherein each of the first energy absorption component and the second energy absorption component has a rectilinear cross section.

7. The battery containment construct of claim 6 wherein the rectilinear cross section of each of the first energy absorption component and the second energy absorption component is a square.

8. The battery containment construct of claim 1 wherein each of the first energy absorption component and the second energy absorption component defines an internal void that is packed with high density foam.

9. The battery containment construct of claim 1 further comprising a high voltage wire extending from the cavity of said tray to a connection point external to said tray.

10. The battery containment construct of claim 1 further comprising a shock absorbing material positioned along an interior surface of said cover.

11. The battery containment construct of claim 1 further comprising a temperature regulation system positioned within the cavity of said tray.

12. The battery containment construct of claim 1 wherein the cavity of said tray is configured to receive a plurality of batteries of an electric or hybrid vehicle.

13. A process of protecting a battery array in an electric or hybrid vehicle said process comprising:
placing a battery array into a battery containment construct of claim 1; and
subjecting said battery containment construct to an impact simulative of a vehicle collision at an angle of 90 degrees along a longitudinal side of said battery containment construct;
wherein upon impact, said battery containment construct deforms less than 18.4 mm.

14. The process of claim 13 further comprising providing a fire resistant or fire-retardant material on or within said battery containment construct.

15. The process of claim 13 further comprising connecting the battery array contained within said battery containment construct to hybrid or electric vehicle systems outside said battery containment construct using a high voltage wire.

16. The process of claim 13 wherein the longitudinal side of said battery containment construct includes an energy absorption component configured to absorb the impact.

17. The process of claim 13 further comprising preventing water penetration into said battery containment construct using a water-tight seal.

18. The process of claim 13 further comprising providing an impact absorbing foam between the battery array and said battery containment construct.

19. The process of claim 13 further comprising regulating a temperature within said battery containment construct using a temperature regulation system.

20. The process of claim 13 further comprising placing a second battery array into a second battery containment construct and stacking said second battery containment construct on said battery containment construct.

21. The battery containment construct of claim 1 wherein the repeating shape of the first energy absorption component and the second energy absorption component is any of a closed hexagon, a closed circle, a closed triangle, a closed oval, a closed square, a closed rectangle, an open semi hexagon, an open semi-circle, open semi oval, an open triangle, an open semi square, open semi rectangle, and a sine wave.

22. The battery containment construct of claim 1 wherein the first energy absorption component and the second energy absorption component are extruded or roll formed.

23. The battery containment construct of claim 1 wherein a length L of each of the first energy absorption component and the second energy absorption component is 5 to 5000 mm.

24. The battery containment construct of claim 1 wherein a distance d between the repeating shape is 0 to 300 mm.

* * * * *